United States Patent Office 3,328,302
Patented June 27, 1967

3,328,302
SYNTHETIC LUBRICANTS COMPRISING ORGANIC ESTERS
Stuart Walter Critchley, Hale Barns, and Peter Michael Blanchard, Sunbury-on-Thames, Middlesex, England, assignors to The Geigy Company Limited, Norfolk, England and The British Petroleum Company Limited, London, England
No Drawing. Filed May 21, 1963, Ser. No. 282,170
Claims priority, application Great Britain, May 24, 1962, 20,001/62
15 Claims. (Cl. 252—51.5)

For some years lubricants for aviation gas turbines have been based on organic diesters such as di-octyl or di-nonyl sebacates, azelates or adipates and blends of these and similar compounds. These diesters blended with load-carrying, antioxidant and other additives can give oils which meet the requirements of the U.S. military specification MIL–L–7808 and which have proved suitable for the lubrication of civil and military turbojet engines. When blended with viscous polyglycol ethers, or viscous complex esters made from dibasic acids, monohydric alcohols and dihydric alcohols, and with suitable antioxidants and other additives, they can give oils which meet the requirements of the British Ministry of Aviation specification DERD 2487 and such oils have proved suitable for the lubrication of military and civil turbojet engines.

Until recently, turbojet aircraft have only been required to operate at subsonic speeds or have been operated at supersonic speeds for relatively short periods. Aircraft are now in service and other aircraft are being developed or designed which will be operated at supersonic speeds for extended periods. Lubricants based on diesters of the type already discussed are not sufficiently stable at high temperatures to be entirely suitable for use in the engines of these supersonic aircraft or some of the more advanced types of subsonic aircraft now in service or being developed. This has led to the development of superior ester-based lubricants.

Certain of these based on trimethylolpropane triesters meet the requirements of the U.S. military specification MIL–L–9236 B for a high temperature aviation gas turbine lubricant. Trimethylolpropane triester blends which meet the requirements of MIL–L–9236 do not, however, in general, meet the requirements of the corresponding British Ministry of Aviation specification DERD 2497 (provisional issue 2), their viscosities at 500° F. and their flash points being lower than the minima allowed by this specification (viz. 1 centistoke and 500° respectively). We have found that certain complex esters made from trimethylolpropane, $C_7$ to $C_{10}$ aliphatic monocarboxylic acids and a dibasic acid such as sebacic acid, or blends of such complex esters with trimethylolpropane triesters, meet the abovementioned requirements of the DERD 2497 (provisional issue 2) specification. Complex esters of this latter type are described in the complete specification filed in pursuance of United Kingdom patent application 38,232/59 and 6,309/60.

The preferred oils described in the above-mentioned applications are made using caprylic acid, trimethylolpropane and sebacic acid in molar proportions of 10:4:1. While complex esters of this type have generally desirable flash point characteristics (ca. 520° F.) their 210° F. viscosity (ca. 7 to 7.5 cs.) is too high to permit their use in all high performance turbojet engines. Some manufacturers engines require a thermally and oxidatively stable oil with a viscosity not greater than 5.5 cs. at 210° F. because a satisfactory rate of heat rejection from the engine bearings cannot be obtained with a more viscous oil.

It is the object of this invention to provide a thermally and oxidatively stable lubricant which has a flash point not less than about 500° F., a 210° F. viscosity not greater than 5.5 cs. and a —40° F. viscosity not greater than 13,000 cs.

The invention consists in a lubricant which consists essentially of a complex ester prepared by reacting together under esterification conditions and in one or more stages:

(a) 1 molecular proportions of 1:1:1-trimethylolpropane, (b) 2.75 to 2.85 molecular proportions of caprylic acid, and (c) 0.125 to 0.075 molecular proportions of at least one straight chain, dicarboxylic acid having 9 to 10 carbon atoms per molecule.

The invention also comprises a method of preparing a complex ester, in which reactants (a), (b) and (c) specified above are reacted together under esterification conditions, in one or more stages and in the proportions indicated. Preferably the relative amounts of reactants (b) and (c) are chosen within the limits given to obtain a substantial balance of carboxyl and hydroxyl groups in the total reaction mixture.

The product of this reaction will of course consist of a mixture of different types of ester and the expression "complex ester" is to be construed accordingly.

In the preparation of the complex ester, the reaction is preferably carried out at a temperature not exceeding 230° C. and until the product has an acidity of about 5 mg. KOH/g. or less, and the product should be stripped under reduced pressure (e.g. 1 mm. Hg. or less) to reduce the proportion of unreacted or partially reacted materials in the product. The stripped product is then preferably given a finishing treatment to reduce its acidity e.g. to 0.05 mg KOH/g. or less. Suitable finishing treatments include water or alkali washing or percolation through alumina or an ion-exchange resin or stirring with the latter materials followed by filtration.

The esterification reaction may be carried out in the presence of a catalyst e.g. toluene-p-sulphonic acid, sodium bisulphate, a tetraalkyl titanate or titanium tetrachloride.

The lubricant according to the invention may also be blended with up to 10% by weight of a triester synthetic lubricant which is a triester of a trihydric alcohol and a monocarboxylic acid, e.g. 1:1:1-trimethylolpropane tricaprylate. The addition of this triester in such small amounts does not seriously affect the desirable properties of the complex ester and it facilitates the production of a finished lubricant of consistent viscosity.

The lubricant also preferably contains from 0.5 to 5.0 percent wt. (preferably 1 to 3 percent wt.) of an antioxidant for synthetic lubricants e.g. of the amine, phenolic or sulphur type. We have found that particularly suitable antioxidants are iminodibenzyl (I) and N,N'-diphenyl-m-phenylenediamine (II).

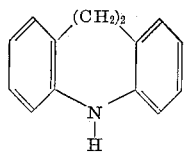  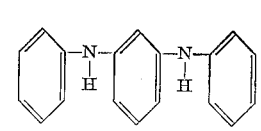

(I)  (II)

By way of example, four complex esters (E1, E2, E3 and E4) were prepared according to the invention. In all cases the esters were prepared from caprylic acid, 1:1:1-trimethylolpropane and sebacic acid in the molecular ratio 2.80:1:0.10 and the esterification reactions were carried out in conventional manner using toluene as a water entrainer. The variables in the reactions are shown in the following Table 1.

TABLE 1

|  | E1 | E2 | E3 | E4 |
| --- | --- | --- | --- | --- |
| Catalyst | None | None | Ti(OBu)₄ | Ti(OBu)₄ |
| Reaction temperature: range °C | 130–200 | 130–230 | 130–200 | 130–200 |
| Period of reaction, hr | 120 | 120 | 72 | 72 |
| Acidity at end of reaction, mg. KOH/g | 5.4 | 1.4 | 0.45 | 1.0 |
| Stripping temperature, °F | 217 | 220 | 216 | 216 |
| Stripping pressure, mm. Hg | 0.2 | 0.2 | 0.4 | 0.3 |
| Final treatment | Alumina | Alumina | Alumina | Resin |
| Final Acidity, mg. KOH/g | 0.05 | 0.05 | 0.05 | 0.05 |
| Viscosity of ester at— |  |  |  |  |
| 210° F., cs | 5.1 | 5.0 | 4.9 | 4.9 |
| −40° F., cs | 6,200 | 5,790 | ---------- | 5,390 |
| Open flash point of ester, °F | 515 | 510 | ---------- | 515 |

The resin was in anionic ion-exchange resin of the polystyrene type containing quaternary ammonium groups. Ti(OBu)₄=titanium tetrabutoxide.

In the case of esters prepared using a titanium catalyst the esterification product was stirred for 4 hours at a temperature not exceeding 50° C. with 10% wt. of a clay used in refining mineral lubricating oils. The clay was then filtered off and the clay treatment was repeated. This reduced the titanium content of the ester to less than 10 p.p.m.

The properties of complex esters E1, E2, E3 and E4 blended with antioxidants are given in Table 2. Each ester was blended with 2% wt. (based on the ester) of iminodibenzyl (IDB), an antioxidant which we have found particularly suitable for lubricants intended for use at very high temperatures in contact with metals including magnesium alloy, aluminum alloy, copper, silver and steel. Ester E1 was also blended with 2% wt. of various other antioxidants, including N,N'-diphenyl-m-phenlenediamine (DPPDA).

lubricants according to the invention give good results in this test.

The thermal stability test referred to in Table 2 is that laid down by the British Ministry of Aviation specification DERD 2497 for high temperature lubricants. According to specification DERD 2497, the change in the 210° F. viscosity of the oil after 6, 12, 18 and 24 hours at 325° C. should in no case be outside the limits −10% to +20%. It will be seen that ester E1 was extremely thermally stable as assessed by this test.

We claim:
1. A liquid complex ester, suitable for use, as a lubricant, prepared by reacting in at least one stage,
   (a) one molecular proportion of 1:1:1-trimethylolpropane,
   (b) 2.75–2.85 molecular proportions of caprylic acid, and
   (c) 0.125–0.075 molecular proportions of at least one alkanoic dicarboxylic acid having 9–10 carbon atoms per molecule.

TABLE 2

|  | Ester | | | | | | | |
| --- | --- | --- | --- | --- | --- | --- | --- | --- |
|  | E1 | E2 | E3 | E4 | E1 | E1 | E1 | E1 |
|  | Antioxidant, 2% wt. in each case | | | | | | | |
|  | IDB | IDB | IDB | IDB | DPPDA | UOP 278 | PANA | PTZ |
| Viscosity at— |  |  |  |  |  |  |  |  |
| 400° F., cs | 1.4 | 1.4 | ------ | 1.4 | ------ | ------ | ------ | ------ |
| 210° F., cs | 5.1 | 5.0 | 4.9 | 4.9 | ------ | ------ | ------ | ------ |
| 100° F., cs | 26.0 | 25.4 | 24.5 | 24.8 | 26.7 | 25.4 | 26.0 | 25.8 |
| −40° F., cs | 7,310 | 6,830 | ------ | 6,525 | ------ | ------ | ------ | ------ |
| Open Flash point, °F | 505 | 530 | ------ | 505 | ------ | ------ | ------ | ------ |
| Pour point, °F | <−75 | ------ | ------ | <−75 | ------ | ------ | ------ | ------ |
| Total acidity, mg. KOH/g | <0.05 | 0.05 | 0.05 | <0.05 | ------ | ------ | ------ | ------ |
| Oxidation/Corrosion Test at 450° F.: |  |  |  |  |  |  |  |  |
| Metal weight changes, mg./cm.²: |  |  |  |  |  |  |  |  |
| Magnesium alloy | +0.1 | +0.3 | +0.1 | +0.1 | −0.3 | 0.0 | 0.0 | 0.0 |
| Aluminum alloy | +0.2 | +0.1 | +0.2 | +0.1 | +0.1 | 0.0 | 0.0 | 0.0 |
| Copper | +0.1 | −0.1 | −0.3 | +0.3 | 0.0 | 0.0 | −0.4 | −0.4 |
| Silver | +0.2 | +0.1 | +0.1 | +0.1 | +0.2 | +0.1 | 0.0 | 0.0 |
| Steel | +0.1 | +0.1 | +0.1 | 0.0 | +0.1 | +0.1 | 0.0 | +0.1 |
| Increase in 100° F. viscosity, percent | 36 | 41 | 33 | 39 | 31 | 51 | 76 | 134 |
| Thermal Stability test at 325° C.: |  |  |  |  |  |  |  |  |
| 210° F. visc. change after 6 hr., percent | −2 | ------ | ------ | ------ | ------ | ------ | ------ | ------ |
| 210° F. visc. change after 12 hr., percent | Nil | ------ | ------ | ------ | ------ | ------ | ------ | ------ |
| 210° F. visc. change after 18 hr., percent | +1 | ------ | ------ | ------ | ------ | ------ | ------ | ------ |
| 210° F. visc. change after 24 hr., percent | +2 | ------ | ------ | ------ | ------ | ------ | ------ | ------ |
| Acidity incr. after 24 hr., mg. KOH/g | 5.45 | ------ | ------ | ------ | ------ | ------ | ------ | ------ |

UOP 278 is a commercially available experimental antioxidant.   PANA=Phenyl-alpha-naphthylamine.   PTZ=Phenothiazine.

The oxidation/corrosion test referred to in Table 2 is similar to that detailed in Pratt and Whitney's "Type II Lubricant" specification. One inch square strips of the five metals indicated are immersed in 100 ml. of the oil under test which is heated to 450° F. for 48 hours: during this period, air is bubbled through the oil at a rate of 5 litres per hour. To meet the specification requirements, a lubricant must give a viscosity increase not in excess of 50% and the metal weight changes must not be in excess of ±0.3 mg./cm.². It will be seen that suitably inhibited 2. A liquid complex ester according to claim 1, in which component (c) is sebacic acid.

3. A liquid complex ester according to claim 1, in which the relative amounts of components (b) and (c) are chosen to obtain a balance of carboxyl and hydroxyl groups in the total reaction mixture.

4. A liquid complex ester, suitable for use as a lubricant, prepared by reacting in at least one stage,
   (a) one molecular proportion of 1:1:1-trimethylolpropane, (b) 2.80 molecular proportions of caprylic acid, and
(c) 0.10 molecular proportion of sebacic acid.

5. A lubricant blend consisting essentially of a mixture of:
   (1) At least 90% by wt. based on the mixture of a liquid complex ester as claimed in claim 1.
   (2) 0–5.0% by wt. based on the mixture of an antioxidant for synthetic lubricants, and
   (3) 0–10% by wt. based on the mixture of a triester synthetic lubricant, being a triester of a trihydric alkanol and an alkanoic monocarboxylic acid.

6. A lubricant blend according to claim 5, in which the proportion of antioxidant is 1–3% by wt.

7. A lubricant blend according to claim 5, in which the antioxidant is iminodibenzyl.

8. A lubricant blend according to claim 5, in which the antioxidant is N:N'-diphenyl-m-phenylenediamine.

9. A lubricant blend according to claim 5, in which the triester lubricant is 1:1:1-trimethylolpropane tricaprylate.

10. The process of making liquid complex esters, in which
   (a) one molecular proportion of 1:1:1-trimethylolpropane,
   (b) 2.75–2.85 molecular proportions of caprylic acid, and
   (c) 0.125–0.075 molecular proportion of at least one alkanoic monocarboxylic acid having 9–10 carbon atoms per molecule
are reacted together under esterification conditions in at least one stage.

11. A process according to claim 10, in which the reactants are heated together in the presence of an esterification catalyst.

12. A process according to claim 10, in which the esterification is carried out in the presence of a catalyst selected from the group consisting of toluene-p-sulphonic acid, sodium bisulphate, tetraalykyl-titanate and titanium tetrachloride.

13. The process of making liquid complex esters, in which
   (a) one molecular proportion of 1:1:1-trimethylolpropane,
   (b) 2.80 molecular proportions of caprylic acid, and
   (c) 0.10 molecular proportion of sebacic acid are reacted together under esterification conditions in at least one stage.

14. A process according to claim 13, in which the reactants are heated together in the presence of an esterification catalyst.

15. A process according to claim 13, in which the esterification is carried out in the presence of a catalyst selected from the group consisting of toluene-p-sulphonic acid, sodium bisulphate, tetraalkyl-titanate and titanium tetrachloride.

References Cited

UNITED STATES PATENTS

| | | |
|---|---|---|
| 2,037,932 | 4/1936 | Semon. |
| 2,273,862 | 2/1942 | Hamilton et al. _____ 252—50 |
| 2,815,354 | 12/1957 | Wilkinson et al. ___ 260—404.8 |
| 2,838,428 | 6/1958 | Bohrer _____ 260—404.8 X |
| 2,870,044 | 1/1959 | Blatz _____ 260—404.8 X |
| 2,937,996 | 5/1960 | Pethrick et al. _____ 252—56 X |
| 2,950,250 | 8/1960 | Fainman _____ 252—56 X |
| 2,991,297 | 7/1961 | Cooley et al. _____ 252—56 X |
| 3,000,917 | 9/1961 | Babayan _____ 252—56 X |
| 3,047,504 | 7/1962 | Peters et al. _____ 252—56 |
| 3,048,608 | 8/1962 | Girard et al. _____ 260—404.8 |
| 3,090,753 | 5/1963 | Matuszak et al. ____ 252—42.7 |

FOREIGN PATENTS

| | | |
|---|---|---|
| 563,910 | 9/1944 | Great Britain. |
| 715,933 | 9/1954 | Great Britain. |

DANIEL E. WYMAN, *Primary Examiner.*

P. P. GARVIN, *Assistant Examiner.*